(12) United States Patent
Mohamad Abdul et al.

(10) Patent No.: US 8,868,597 B2
(45) Date of Patent: Oct. 21, 2014

(54) DIRECTORY SERVER PROCESSING REQUESTS BASED ON HIERARCHICAL MODELS WHILE USING BACKEND SERVERS OPERATING BASED ON RELATIONAL MODELS

(75) Inventors: Mohamad Raja Gani Mohamad Abdul, Madurai (IN); Rohit Banga, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 76 days.

(21) Appl. No.: 13/477,081

(22) Filed: May 22, 2012

(65) Prior Publication Data

US 2013/0318117 A1    Nov. 28, 2013

(51) Int. Cl.
*G06F 17/30* (2006.01)
(52) U.S. Cl.
USPC ......................................................... 707/769
(58) Field of Classification Search
USPC .................. 707/769, 805, 809, 810, 828, 829
See application file for complete search history.

(56) References Cited

U.S. PATENT DOCUMENTS

| | | | |
|---|---|---|---|
| 6,985,905 B2 * | 1/2006 | Prompt et al. | 707/829 |
| 7,428,756 B2 | 9/2008 | Wookey | |
| 7,707,168 B2 | 4/2010 | Valliappan et al. | |
| 7,904,487 B2 | 3/2011 | Ghatare | |
| 2001/0034733 A1 * | 10/2001 | Prompt et al. | 707/102 |
| 2002/0046301 A1 | 4/2002 | Shannon et al. | |
| 2010/0122239 A1 | 5/2010 | Neufeld et al. | |
| 2010/0262631 A1 * | 10/2010 | Andersson et al. | 707/809 |

OTHER PUBLICATIONS

Johann Eder et al., Self-maintained Folder Hierarchies as Document Repositories, 2001, IEEE, 400-407.*
"Opends Wiki: Client API", "Better Client API", https://www.opends.org/wiki/page/ClientAPI, downloaded circa Mar. 28, 2011, pp. 1-6.
"Java Technology", "Openicom a JPA Framework for Integrated Collaboration Environments", http://www.neoows.com/storypage/http://www.java.net/article/2011/03/21/openicom-jpa-framework-integrated-collaboration-environments-part-1, downloaded circa Mar. 28, 2011, pp. 1-18.
"Master Thesis, Trinh, Tien Trung", "Migration From Legacy Persistence API to JPA (Java Persistence API) Based Implementation", http://opus.haw-amburg.de/volltexte/2008/694/pdf/Master_Thesis.pdf, dated: Hamburg, Nov. 4, 2008, pp. 1-107.
"Sun One", "The Importance of Sun One Meta-Directory", http://download.oracle.com/docs/cd/E19130-01/816-6338-10/overview.html, Downloaded circa Mar. 28, 2011, pp. 1-11.
"Oracle", "Oracle Virtual Directory", http://www.oracle.com/technetwork/middleware/id-mgmt/index-093158.html, Downloaded circa Jun. 1, 2012, pp. 1-2.

(Continued)

*Primary Examiner* — Jean B Fleurantin
(74) *Attorney, Agent, or Firm* — Narendra Reddy Thappeta

(57) ABSTRACT

A virtual directory server (VDS) processes requests based on a first hierarchical model while using a backend server operating based on a relational model. In one embodiment, classes representing the tables and columns in the relation model are generated according to a second hierarchical model (class hierarchy). On receiving a directory request for values' corresponding to attributes in the first hierarchical model, tables and columns corresponding to the requested attributes are identified. A query according to the relational model is constructed employing the generated classes (of the second hierarchical model), the query including the identified tables and columns. The query is then executed in the backend server to retrieve the values corresponding to the attributes, and the values are then sent (according to the first hierarchical model) as a reply to the directory request.

20 Claims, 12 Drawing Sheets

(56) References Cited

OTHER PUBLICATIONS

"Eclipsepedia", "Eclipselink/Development/Dynamic", http://wiki.eclipse.org/EclipseLink/Development/JPA/Dynamic, Downloaded circa Jun. 1, 2012, pp. 1-11.

"Eclipselink", "Eclipse Persistence Services Project", http://wiki.eclipse.org/EclipseLink, Downloaded circa Jun. 1, 2012, p. 1-1.

"Eclipsepedia", "Eclipselink/Examples/JPA/Dynamic", http://wiki.eclipse.org/EclipseLink/Examples/JPA/Dynamic, Downloaded circa Jun. 1, 2012, pp. 1-7.

* cited by examiner

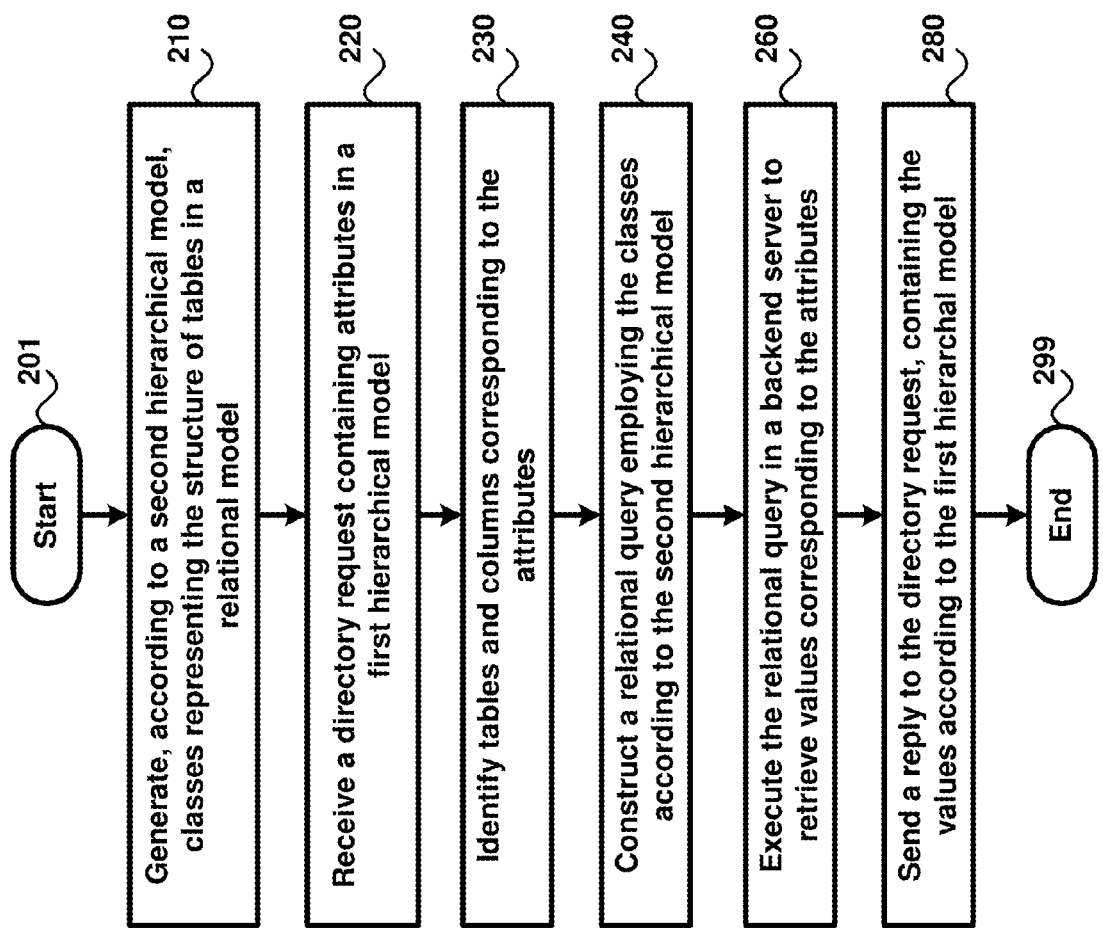

| EMPID | UID | LAST_NAME | EMAIL | CITY | COUNTRY | PCODE | DEPID |
|---|---|---|---|---|---|---|---|
| 1 | Mary | Austen | mary.austen@acme.com | San Francisco | US | 94065 | 101 |
| 2 | Aaron | Doe | aaron.doe@acme.com | Bangalore | IN | 560029 | 101 |
| 3 | Monty | Nair | monty.nair@acme.com | Bangalore | IN | 560029 | 102 |

410

| DEPID | NAME | DESCRIPTION |
|---|---|---|
| 101 | ST | Server Technologies |
| 102 | HR | Human Resources |

420

| EMPID | PHONE |
|---|---|
| 1 | 543-814-534 |
| 1 | 238-544-239 |
| 2 | 92310-45612 |
| 3 | 80021-99744 |

RDBMS WorkFlowElement

Create RDBMS WFE — Create RDBMS Table Objects — Establish Join Conditions — RDBMS Object Class and Attribute Mapping — Summary RDBMS WorkFlowElement Summary NetworkGroup: network:group   Suffix: dc=acme, dc=com ← 510

[Back] [Next] [Finish] [Cancel]   *Required

| RDBMS Connection Details | RDBMS Tables | Object Class Mappings |

520

Basic Properties
 Target Datebase : ORACLE11G        Username : test
 JDBC URL : jdbc:oracle:thin:@localhost:1521:orcl    Password : password Advanced Properties
 Minimum Connection Pool Size : 10     Login Timeout : 0
 Maximum Connection Pool Size : 20     Connection Reuse Count : 0
 Initial Conncetion Pool Size : 0      Inactive connection timeout : 50
 Enabled : true

[Exit]

*FIG. 5A*

```xml
<dataBase>
    <driver>oracle.jdbc.driver.OracleDriver</driver>
    <url>jdbc:oracle:thin:@hr.localhost:1521:orcl</url>
    <user>test</user>
    <password>{AES-CBC}ytKCmdzHP/RHoQT5FyuWqNN1agFeHs589ZtcGLTjPc8=</password>
    <ignoreObjectClassOnModify>false</ignoreObjectClassOnModify>
    <includeInheritedObjectClasses>true</includeInheritedObjectClasses>
    <minConnections>10</minConnections>
    <maxConnections>20</maxConnections>
    <inactiveConnectionTimeout>50</inactiveConnectionTimeout>
    <mapping>
        <joins>
            <join>TEST.DEPARTMENT.DEPID=TEST.EMPLOYEE.DEPID</join>
        </joins>
        <objectClass name="organization" rdn="o">
            <attribute ldap="id" field="DEPID" table="TEST.DEPARTMENT" />
            <attribute ldap="o" field="NAME" table="TEST.DEPARTMENT" />
            <attribute ldap="orgDescription" field="DESCRIPTION" table="TEST.DEPARTMENT" />
        </objectClass>
        <objectClass name="inetOrgPerson" rdn="cn,o">
            <attribute ldap="cn" field="UID" table="TEST.EMPLOYEE" />
            <attribute ldap="sn" field="LAST_NAME" table="TEST.EMPLOYEE" />
            <attribute ldap="mail" field="EMAIL" table="TEST.EMPLOYEE" />
            <attribute ldap="o" field="NAME" table="TEST.DEPARTMENT" type="" />
        </objectClass>
    </mapping>
</dataBase>
```

580 — braces grouping from `<dataBase>` through `<inactiveConnectionTimeout>`

590 — braces grouping from `<mapping>` through `</mapping>`

FIG. 5D

DIRECTORY SERVER PROCESSING REQUESTS BASED ON HIERARCHICAL MODELS WHILE USING BACKEND SERVERS OPERATING BASED ON RELATIONAL MODELS

BACKGROUND OF THE INVENTION

1. Technical Field

The present disclosure relates to directory services, and more specifically to a virtual directory server processing requests based on hierarchical models while using backend servers operating based on relational models.

2. Related Art

A directory server refers to a server/machine, which provides values in response to names received in directory requests from client systems. The values typically represent identity information related to an enterprise such as users, dynamic/static groups, resources, organizational units, etc., as is well known in the relevant arts.

The names are often organized in a hierarchical model, implying that there are names at multiple levels in the model. The requests may specify a sequence of names, representing a hierarchical connected path in the model, and the value(s) corresponding to the requested path are sent back as a response. LDAP (light-weight directory access protocol) is a common protocol according to which requests are sent to directory servers.

Backend servers often provide data forming the basis for responses to the directory requests. Thus, a directory server receives such data and incorporates the received data in the responses to the directory requests. The backend servers can be independent directory servers, in which case the directory server, interfacing with the client systems, is termed as a virtual directory server (VDS). A VDS can operate with database systems type machines as backend servers also.

There are often situations in which the identity information maintained in backend servers is organized according to relational models. As is well known, in a relational model, the (identity) information is organized as tables containing rows and columns A relational database management system (RDBMS) is an example of a backend server that maintains information according to a relational model.

There is a general need to simplify the implementation of a directory server in such environments, in particular, when interfacing with backend servers operating based on relational models.

SUMMARY OF THE INVENTION

A virtual directory server (VDS) processes requests based on a first hierarchical model while using a backend server operating based on a relational model. In one embodiment, classes representing the tables and columns in the relation model are generated according to a second hierarchical model (class hierarchy). On receiving a directory request for values' corresponding to attributes in the first hierarchical model, tables and columns corresponding to the requested attributes are identified. A query according to the relational model is constructed employing the generated classes (of the second hierarchical model), the query including the identified tables and columns. The query is then executed in the backend server to retrieve the values corresponding to the attributes, and the values are then sent.

BRIEF DESCRIPTION OF THE DRAWINGS

Example embodiments of the present invention will be described with reference to the accompanying drawings briefly described below.

FIG. 2 is a flow chart illustrating the manner in which a virtual directory server processes requests based on hierarchical models while using backend servers operating based on relational models according to an aspect of the present invention.

FIG. 4A depicts sample tables storing directory information according to relational model in one embodiment.

FIGS. 5A-5C together illustrate the manner in which mapping between a hierarchical model (according to which directory is represented) and a relational model (according to which identity information is stored) is specified in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

According to an aspect of the present invention, a virtual directory server (VDS) processes requests based on a first hierarchical model while using a backend server operating based on a relational model. In one embodiment, classes representing the tables and columns in the relation model are generated according to a second hierarchical model (class hierarchy). On receiving a directory request for values' corresponding to attributes in the first hierarchical model, tables and columns corresponding to the requested attributes are identified. A query according to the relational model is constructed employing the generated classes, the query including the identified tables and columns. The query is then executed in the backend server to retrieve the values corresponding to the attributes, and the values are then sent (according to the first hierarchical model) as a reply to the directory request.

According to another aspect of the present invention, the classes corresponding to the tables and columns are generated according to a programming language environment of the VDS, in which a developer implements programming logic for processing directory requests. The developer is accordingly facilitated to construct the relational queries by employing the set of classes in the programming language.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1A:
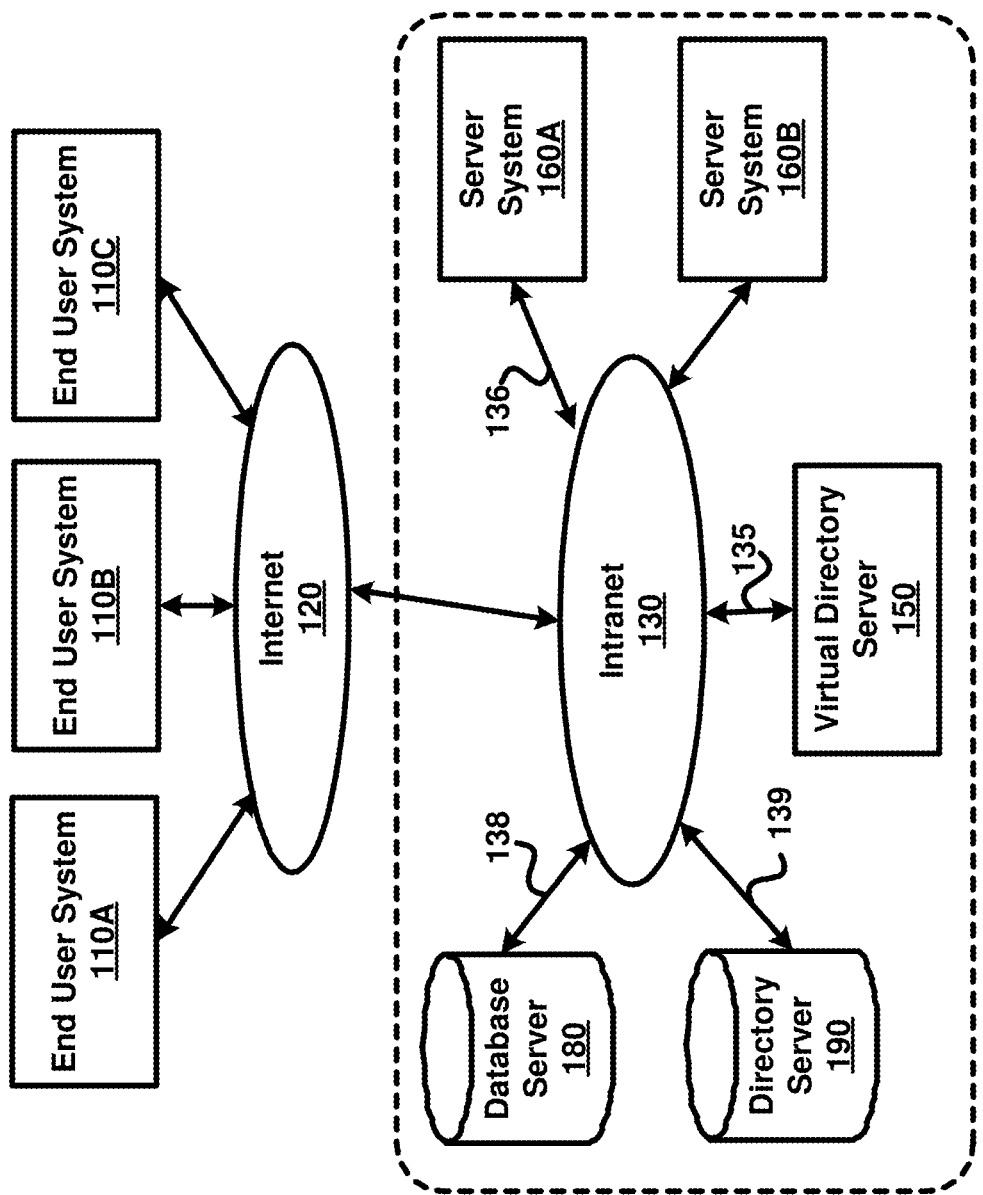
FIG. 1A is a block diagram illustrating an example environment (computing system) in which several aspects of the present invention can be implemented.

FIG. 1A is a block diagram illustrating an example environment (computing system 100) in which several aspects of the present invention can be implemented. The block diagram is shown containing end user systems 110A-110C, Internet 120, intranet 130, virtual directory server (VDS) 150, server systems 160A-160B, database server 180 and directory server 190.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 130 represents a network providing connectivity between VDS 150, server systems 160A-160B, and database server 180 and directory server 190, all provided within an enterprise (as indicated by the dotted boundary). Internet 120 extends the connectivity of these (and other systems of the enterprise) with external systems such as end user systems 110A-110C. Each of intranet 130 and Internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

Each of end user systems 110A-110C represents a system such as a personal computer, workstation, mobile station, etc., used by users to generate (user) requests directed to business/enterprise applications executing in server systems 160A-160B. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Each of database server 180 and directory server 190 represents a non-volatile (persistent) storage facilitating storage and retrieval of a collection of data by business/enterprise applications executing in server systems 160A-160B. Accordingly, database server 180 and directory server 190 may be viewed as backend servers that provide data (such as directory information) forming the basis of the responses generated by the business/enterprise applications.

Database server 180 represents a persistent storage implemented according to relational database technologies and provides storage and retrieval of data using structured queries such as SQL (Structured Query Language). As is well known, database servers store data according to a relational model in the form of tables containing rows and columns, with the SQL queries facilitating the retrieval of data according to such a relational model.

Directory server 190 represents a persistent storage implemented to store a directory of information related to an enterprise (such as users, dynamic/static groups, resources, organizational units, etc.). The information may be maintained by enterprise applications executing in server systems 160A-160B. Broadly, the enterprise information is stored in the form of entries, with each entry containing a set of attributes that hold information about the real-world object (e.g., person, organizational unit, country, etc.) that the entry represents. Each attribute has an associated unique name/description referred to as Distinguished Name (DN) and one or more associated values.

Each entry stored in directory server 190 is also associated with a Relative Distinguished Name (RDN) relative to a second entry (considered as the entry's immediate superior). The second entry similarly has an associated RDN relative to a third (superior) entry. The DN of each entry is accordingly defined as the concatenation of the entry's RDN and its immediate superior's DN. Due to such a naming convention, the set of entries stored in directory server 190 can be viewed as being organized according to a hierarchical data model (with the root being the entry with no RDN).

Directory server 190 is designed to process requests according to lightweight directory access protocol (LDAP). In response to a client (such as one of server systems 160A-160B) sending a LDAP request indicating the operation to be performed on the directory, directory server 190 performs the requested operation and then sends a response containing the result of performance of the operation to the client.

Though only a single system is shown for conciseness, a directory is generally implemented as a collection of one or more server systems that co-operates to provide directory services. More details on directory and LDAP are described in RFC 4511, while details on the hierarchical/directory information models are described in RFC 4512.

Each of server systems 160A-160B represents a server, such as a web/application server, executing business/enterprise applications capable of performing tasks (e.g., processing requests like user authentication, determining roles associated with a user etc) requested by users using one of end user systems 110A-110C. A server system may use data stored internally, external data (e.g., identity information) maintained in database server 180/directory server 190 or that received from external sources (e.g., from the user) in performing such tasks. The server system then sends the result of performance of the tasks to the requesting end user system (one of 110A-110C).

In one embodiment, the identity information related to the enterprise is distributed across different backend servers such as database server 180 and directory server 190, with different data stores processing requests based on different (relational, hierarchical, etc.) models.

The enterprise applications executing in server systems 160A-160B are accordingly designed to access the stored identity information by sending requests to a virtual directory server (such as VDS 150). The manner in which data may be accessed using a virtual directory server is described below with examples.

3. Accessing Data Using a Virtual Directory Server

Figure 1B:
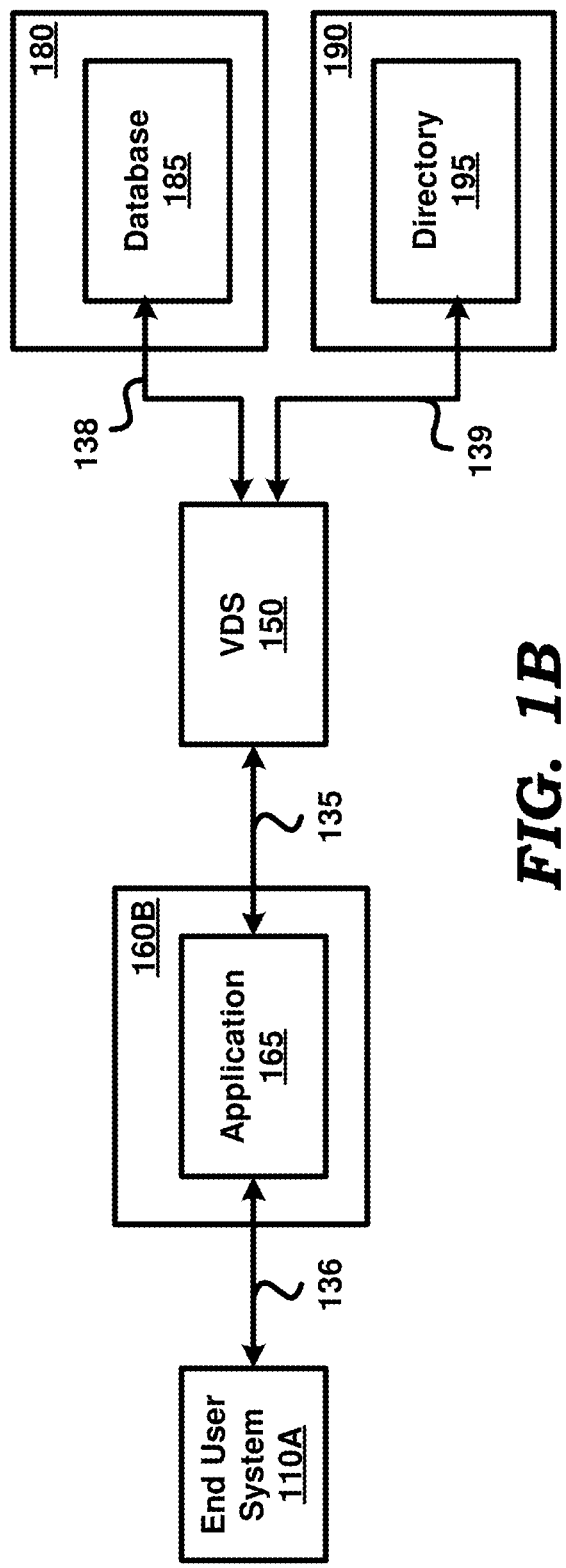
FIG. 1B is a block diagram depicting additional details of the computing system of FIG. 1A, illustrating the manner in which data is accessed using a virtual directory server in one embodiment.

FIG. 1B is a block diagram depicting additional details of computing system 100 of FIG. 1A, illustrating the manner in which data is accessed using a virtual directory server (150) in one embodiment. Each of the blocks is described in detail below.

Application 165 represents a business/enterprise application executing in server system 160B which receives (client) requests for performing specific tasks from users using end user system 110A (via path 136). In response to the requests, application 165 may send directory requests directed to VDS 150 (via path 135) for accessing/retrieving the identity information (such as those noted above) required for processing of the requests. The directory requests are according to LDAP, and specify hierarchically connected paths (for retrieving, adding, modifying or deleting the desired entries and/or attribute values) in the hierarchical model exposed by VDS 150.

Virtual directory server (VDS) 150 provides an abstraction (into a single directory view) of related/different identity information maintained in diverse data sources (backend servers) such as LDAP directories, databases, web services, etc. Virtual directory server (VDS) 150 is designed to process directory requests based on hierarchical model, for example, according to LDAP. VDS 150 receives the directory requests from application 165 and then process the requests based on the information available in the backend servers.

The description is continued assuming that VDS 150 facilitates access to identity information maintained on the backend servers—database server 180 and directory server 190. It may be appreciated that some of the directory information is stored according to a hierarchical model in directory 195 (in directory server 190), while some of the directory information is stored according to a relational model in database 185 (in database server 180).

VDS 150 accordingly sends access requests (via paths 138 and 139) to the backend servers consistent with the corresponding implementation. For example, the access requests sent on path 139 to directory server 190 are according to LDAP protocol for accessing portions of directory 195, while the access requests sent on path 138 to database server 180 contain SQL queries for accessing portions of database 185.

It may be appreciated that the generation of the access requests to backend servers operating based on hierarchical models (such as directory server 190) can be performed in a known way (since both the directory requests and access requests are according to a hierarchical model). However, the access requests/queries to backend servers operating based on relational model (such as database server 180) need to be generated consistent with the directory request sought to be processed.

Several features of the present invention are described below with respect to processing of search requests (for information to be retrieved based on a specified criteria) by VDS 150. However, the features of the present invention may be implemented in the context of other types of requests (for example, to add new entries, update or delete existing entries) as well, as will be apparent to one skilled in the relevant arts by reading the disclosure herein. The manner in which a search request is processed in a prior approach is described in detail below.

In one prior approach, the specific programming logic for generating the SQL queries according to the received directory requests is implemented within VDS 150. A sample set of instructions for generating SQL queries is shown below (according to Java™ like pseudo-code instructions):

StringBuilder sqlBuilder=new StringBuilder ( );
  sqlBuilder.append ("SELECT*FROM");
  for (string table:tableList)
    sqlBuilder.append (table).append(",");
  sqlBuilder.append ("WHERE");
  sqlBuilder.append (condition1);
  sqlBuilder.append ("AND");
  sqlBuilder.append (condition2);

where "SELECT", "FROM", "WHERE", and "AND" are keywords according to SQL, "tableList" is a variable storing a list of tables (in database 185) identified corresponding to the received directory request, and "condition1", and "condition2" are variables storing conditions generated corresponding to the search criteria received in the directory request to VDS 150.

It may be appreciated that SQL queries generated in the prior approach are based on the logic implemented by developers of VDS 150. One drawback to such generation is that the generated SQL queries may not be optimal (in terms of the number of tables/rows/columns accessed, number of SQL queries executed based on relationships between tables, the time taken to process queries, the number of specific operations such as "joins" performed, etc.). The SQL queries may also not be generated without taking into consideration the optimizations possible in different implementations of the (same) database server as provided by different vendors.

In one embodiment, the programming logic implemented within VDS 150 is based on the declarative mappings specified (for example, by an administrator of VDS 150 using an appropriate interface) between objects in the hierarchical (LDAP) data model to data entities in the relational data model. The declarative mappings facilitate VDS 150 to be configured to operate with any customer specific database schema used for storing the identity information (in database server 180). As such, the implementation of VDS 150 for generating SQL queries corresponding to LDAP operations is made more complex/difficult.

VDS 150, provided according to several aspects of present invention, processes directory requests based on hierarchical models while overcoming at least some of the drawbacks noted above. The manner in which VDS 150 processes requests based on hierarchical models is described below with examples.

4. Processing Requests Based on Hierarchical Model

FIG. 2 is a flow chart illustrating the manner in which a virtual directory server processes requests based on hierarchical models while using backend servers operating based on relational models according to an aspect of the present invention. The flowchart is described with respect to FIGS. 1A and 1B merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, VDS 150 generates a set of classes representing the structure (column names, data types, etc.) of the tables and relationships between tables in a relational model (for example, in database server 180). The set of classes are generated according to a second hierarchy model (hereafter referred to as "class hierarchy"). The classes may be generated dynamically (on-the-fly) based on mapping information specified in a configuration data used by VDS 150, such that no static classes (manually defined by a developer) need to be specified.

As is well known in object oriented programming paradigm, each class represents a template for capturing the state and behavior of real-world objects sought to be modeled (here, tables). The classes are organized in the form of a corresponding class hierarchy, with the links in the class hierarchy representing relationships/associations between the real world objects.

With respect to modeling of tables, the links correspond to the one-to-one, one-to-many, or many-to-many relationships (commonly specified using primary key and foreign key relationship, etc.) between the tables. As such, the class hierarchy represents the structure of the data entities (tables, columns, rows, etc.) in the database server, and is accordingly different from the LDAP hierarchical model noted below.

In step 220, VDS 150 receives a directory (search) request for values corresponding to a set of attributes in a first hierarchical (data) model, for example, commonly associated with LDAP protocol noted above (and hereafter referred to as "LDAP hierarchical model"). In one embodiment, the search request includes a search criteria (as specified in RFC 4515) to indicate that the entries (containing attributes and corresponding values) matching the search criteria are to be retrieved as the result of the search.

In step 230, VDS 150 identifies a set of tables, and a set of columns thereof, in the relational data model corresponding to the attributes (and the search criteria) specified in the received directory request. The tables and columns may be identified, for example, based on configuration data typically provided by an administrator or a developer, in a known way (e.g. using the declarative mappings noted above).

In step 240, VDS 150 constructs a relational query employing the generated classes (corresponding to the tables and columns identified in step 230). The term 'employing' implies that the inputs to such construction are specified using the definitions in the classes (generated in step 210). The relational query is according to the relation model that is supported by a backend server (such as database server 180). In other words, the backend server is designed to provide directory information as corresponding responses only to queries according to the relational model. The relational query may be constructed according to SQL, as noted above.

In step 260, VDS 150 executes the (constructed) relational query in a backend server (supporting the relation model, such as database server 180) to retrieve values corresponding to the attributes specified in the relational/SQL query. The execution of the query entails sending the relational query to the backend server and receiving a corresponding response containing the values.

In step 280, VDS 150 sends a reply to the directory request (received in step 220), containing the values (retrieved from the backend server) according to the first/LDAP hierarchical model noted above. In one embodiment, VDS 150 first obtains the response to the relational query according to the class hierarchy, and then converts the values in the class hierarchy model to the LDAP hierarchical model (based on the generated classes) before sending the reply to the directory request. The flow chart ends in step 299.

Thus, VDS 150 processes directory requests based on hierarchical models while using backend servers operating based on relational models. It may be appreciated, that by employing the generated classes to construct relational queries to be sent to the backed server, the logic to construct the relational queries is simplified within VDS 150. Furthermore, since the response from relational queries is also mapped to generated classes, the logic to convert from the class hierarchy model to LDAP hierarchical model is also simplified. The generated set of classes may accordingly be designed to construct optimal queries, while taking into consideration the optimizations provided by different vendors.

Furthermore, by (a) mapping tables & columns provided in VDS 150 to generated classes; and (b) using the generated classes to map LDAP directory request to relational SQL query, the developers of VDS 150 are relieved of manually implementing the logic to map every type of LDAP request to corresponding SQL query. Thus, any modifications to the hierarchical and/or relational models may necessitate corresponding changes to be made only to the configuration data and classes generated for the configuration data would automatically handle the mapping from LDAP to SQL and vice versa.

The description is continued with respect to the manner in which VDS 150 may be implemented to process directory requests based on hierarchical models while using backend servers operating based on relational models.

5. Example Implementation

Figure 3:
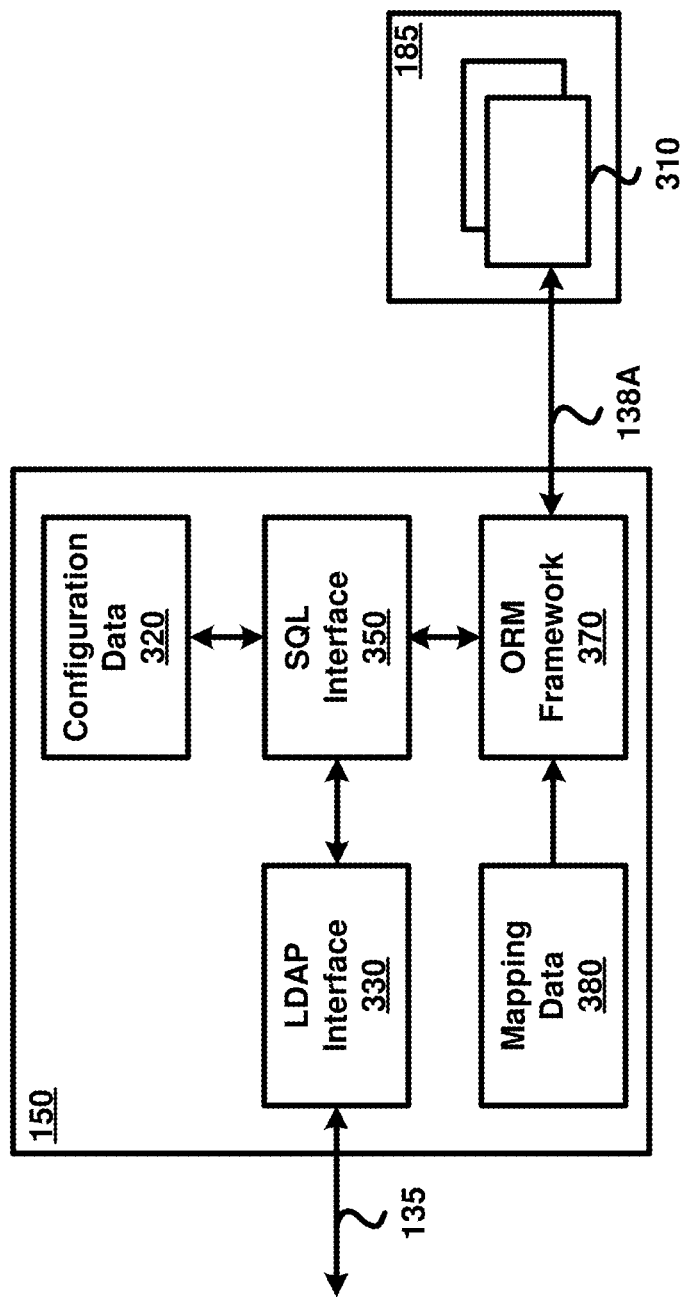
FIG. 3 is a block diagram illustrating the details of a virtual directory server in one embodiment.

FIG. 3 is a block diagram illustrating the details of virtual directory server (VDS 150) in one embodiment. VDS 150 is shown containing configuration data 320, LDAP interface 330, SQL interface 350 (shown communicating with tables 310), object relational mapping (ORM) framework 370 and mapping data 380. Each of the blocks is described in detail below.

Tables 310 in database 185 store directory/employee information according to a relational model, that is, in the form of tables, rows and columns FIG. 4A depicts sample tables (310) storing directory information according to relational model in one embodiment. In particular, "Employee" table 410 is shown storing information such as the UID, LAST_NAME, EMAIL, CITY, etc. for different employees of a business entity. "Department" table 420 is shown storing information such as NAME, DESCRIPTION, etc., corresponding to different departments of the business entity, while "Phone" table 430 is shown storing phone numbers of the employees.

It may be observed that the unique identifier DEPID of the department is used as a foreign key in employee table 410 to indicate the specific department to which each employee belongs. Also the unique identifier EMPID of each employee is shown used as a foreign key in phone table 430 to specify the phone numbers of the employee. The foreign keys may accordingly be viewed as indicating different (such as one-to-one, one-to-many, or many-to-many) relationships between the various tables of 310.

Referring back to FIG. 3, LDAP interface 330 is designed to receive (via path 135) directory requests according to LDAP hierarchical model. The hierarchical model, in general, represents a specific hierarchical view of the employee information stored in tables 310. An example hierarchical view/model that may be exposed by VDS 150 is described in detail below.

Figure 4B:
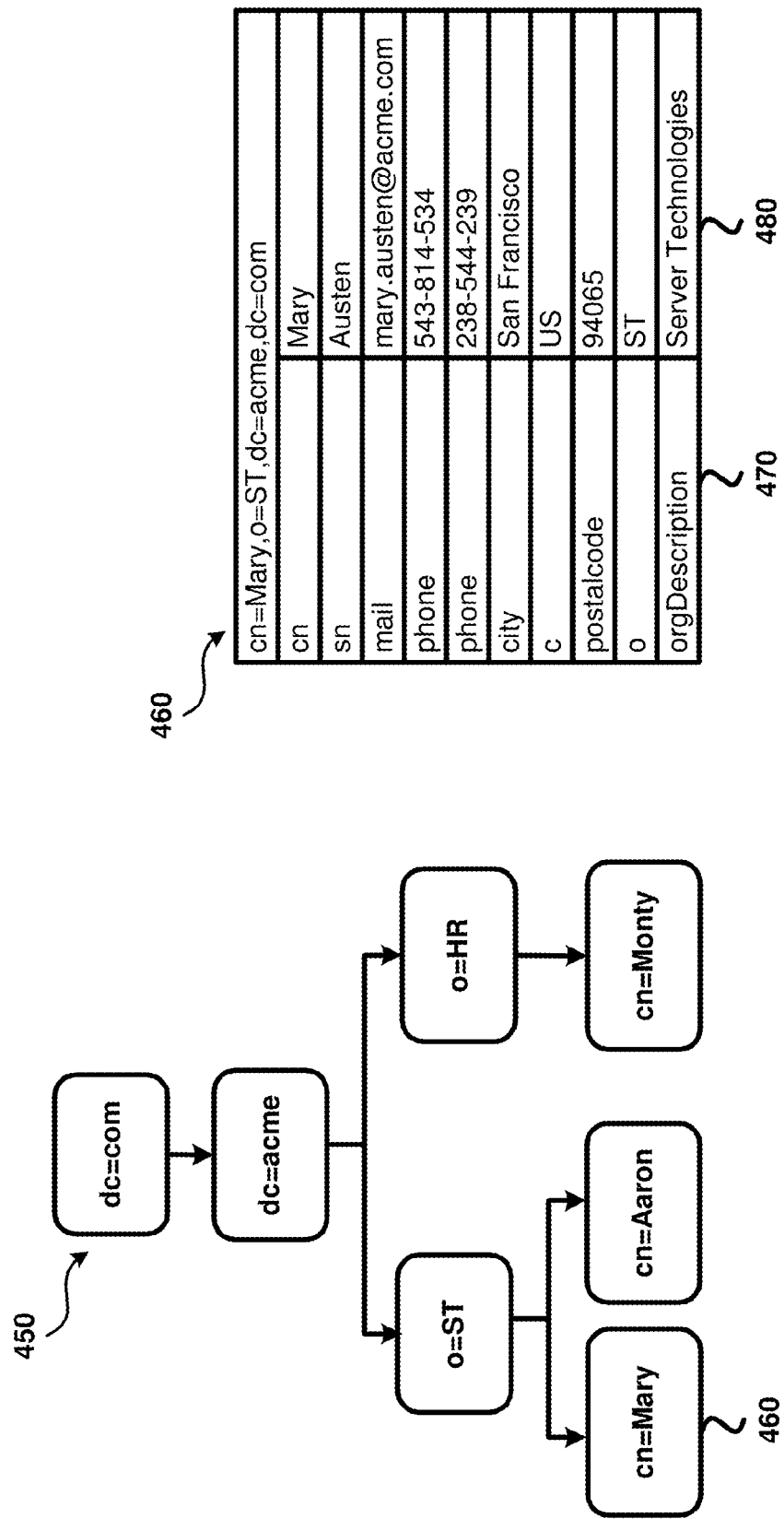
FIG. 4B depicts a sample hierarchical model exposed by a virtual directory server in one embodiment.

FIG. 4B depicts a sample hierarchical model exposed by a virtual directory server (150) in one embodiment. Model 450 depicts a specific hierarchical view of the directory information stored in tables 310, in particular, 410, 420 and 430 of FIG. 4A. Model 450 is shown containing top level domain components such as dc=com and dc=acme representing the business entity. The business entity is then shown containing organizational units (or organizations) such as ST and HR, with each organization then containing persons referred to by their common names (cn) such as Mary, Aaron, etc.

Each of organization and person represents an object class (to identify a family of objects) containing one or more attributes. For example, the person object class 460 is shown containing different attributes such as cn, sn, mail, phone, etc. in column 470. The corresponding values for the person "Mary" is shown in column 480. It may be observed that the values of the attributes such as cn, sn, mail, city, etc. correspond to the values stored in employee table 410 for EMPID=1, while the values for the phone attribute correspond to the values stored in phone table 430 for the same EMPID=1. The values for the attributes "o" (organization name) and "orgDescription" correspond to the values stored in department table 420 for DEPID=101 (the value specified for the employee "Mary" in the DEPID column in table 410).

Thus, a hierarchical view/model of the directory information stored according to a relational model is provided by VDS 150. It may be appreciated that any desired hierarchical model may be indicated by an administrator of VDS 150 using database 185 by specifying the mappings between the object classes and attributes of the LDAP hierarchical model and the data entities (tables, rows, columns, etc.) of the relational model in tables 310. The manner in which the configuration data may be specified is described in detail below.

6. Configuration and Mapping Data

Figure 5B:
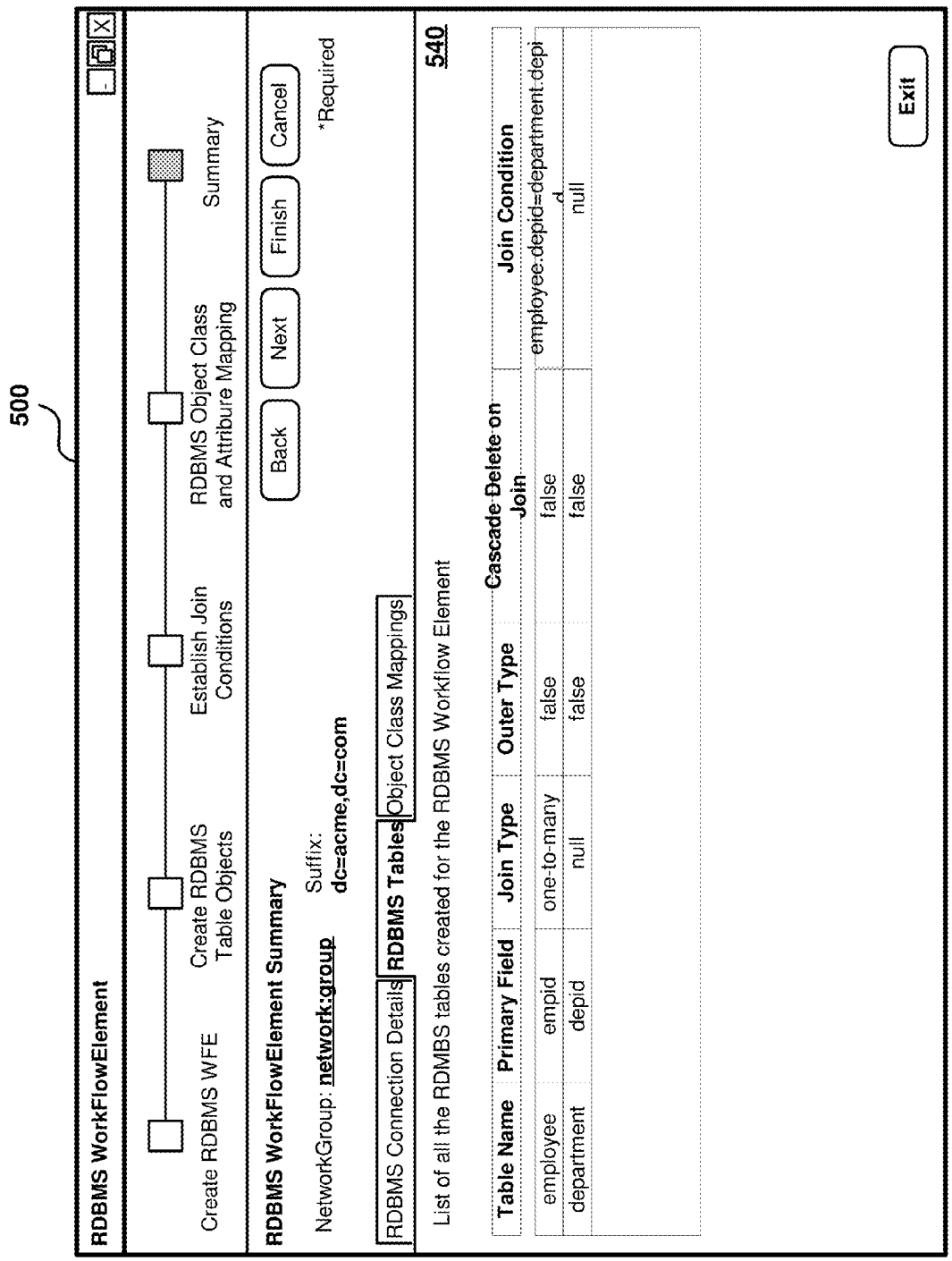
Figure 5C:
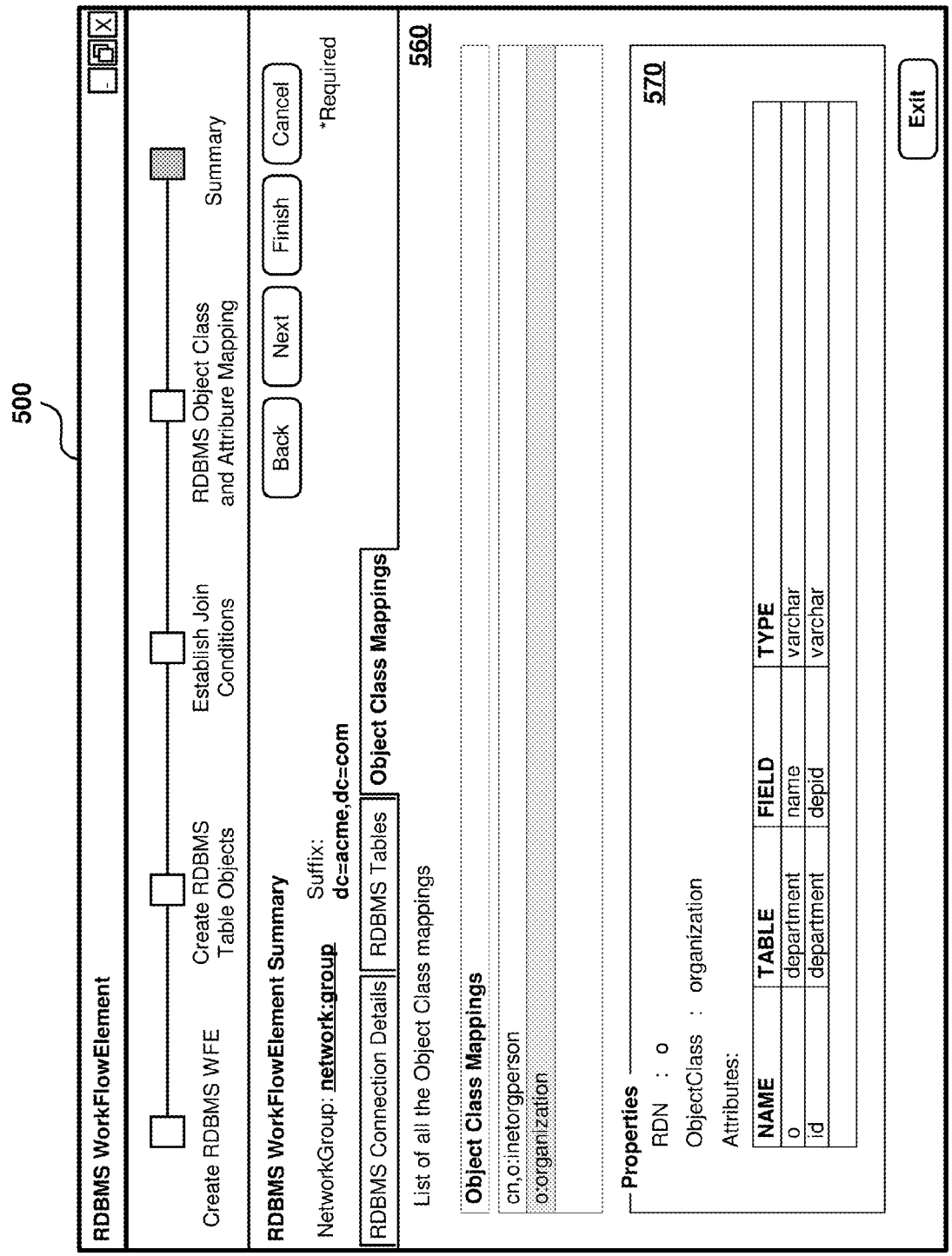

FIGS. 5A-5C together illustrate the manner in which mapping between a hierarchical model (according to which directory is represented) and a relational model (according to which identity information is stored) is specified in one embodiment. Display area 500 depicts a portion of a user interface displayed in response to requests received from an administrator using one of VDS 150, server systems 160A-160B or end user systems 110A-110C. The user interface may be displayed on a display unit (not shown) associated with the requesting system.

In FIG. 5A, display area 510 indicates the specific domain components under which the various object classes are to be exposed in the hierarchical model, while display area 520 specifies the information (such as a username, password, etc.) and the options to be used when connecting to the backend server (database 185). In FIG. 5B, display area 540 specifies the tables sought to be mapped and the corresponding join conditions/relationships (if any) to be used for retrieving values from multiple tables.

In FIG. 5C, display area 560 indicates the specific object classes and attributes to be exposed by VDS 150, while display area 570 specifies the mappings between the object classes and attributes (such as "organization" and "o") to the corresponding data entities such as table "Department" and field/column "Name" (as shown in 420), etc. A similar mapping may be specified between the attributes "cn", "sn", "mail", etc. of LDAP inetorgperson/person object class and columns UID, LAST_NAME, EMAIL, etc. of employee table 410.

It should be noted that the user interfaces of FIGS. 5A-5C depict a summary of the mappings specified by the administrator. However, various other similar user interfaces (not shown) can also be provided (prior to the user interfaces of FIGS. 5A-5C) to enable the administrator to specify the connectivity details, the RDBMS tables in the database sought to be mapped, the specific join conditions to be used when retrieving information from different tables, and the specific mappings between the attributes of LDAP and the RDBMS entities such as tables and columns. Furthermore, other types of interfaces such as Command Line Interface may be provided instead of or in addition to the interfaces of FIGS. 5A-5C.

Referring back to FIG. 3, configuration data 320 represents the mappings between the LDAP hierarchical model exposed by VDS 150 and the relational model of tables 310. Configuration data 320 may be specified using the user interfaces of FIGS. 5A-5C as described above, and then stored in any convenient manner and/or format. FIG. 5D depicts the manner in which configuration data is stored according to XML format in one embodiment. It may be observed that data portions 580 and 590 correspond respectively to the information specified in the user interfaces of FIGS. 5A-5C.

Mapping data 380 represents the mappings between the classes in the class hierarchy model and the relational model of tables 310. Broadly, mapping data 380 is in the form of one or more definition files (generally specified according to XML format) that indicates the mappings between the classes and fields (of the classes) to corresponding tables and columns in the database (185). These mapping definition files are typically constructed in-memory on-the-fly by VDS server 150 based on configuration data 320 provided using user interfaces shown in FIGS. 5A-5C.

Mapping data 380 is used by SQL interface 350 to initialize ORM framework 370 programmatically. In response to receiving the identifiers of the classes to be generated programmatically, ORM framework 370 generates the classes (in memory) based on the mappings indicated in mapping data 380. Such a feature of ORM framework is commonly referred to as Dynamic Persistence in ORM parlance. More details on dynamic persistence and the mapping data is available in a document entitled, "EclipseLink/Examples/JPA/Dynamic" available from Eclipse Foundation, Inc., 102 Centrepointe Drive, Ottawa, Ontario, Canada, K2G 6B1.

The description is continued with an overview of processing of an LDAP request, followed by the manner in which an example directory (search request) is processed.

7. Processing LDAP Requests

Broadly, a start-up module (not shown) in VDS 150 initializes SQL interface 350 according to configuration data 320. SQL interface 350 in turn initializes ORM framework 370 with ORM entities based on the mappings specified in configuration data 320 and mappings data 380. SQL interface 350 uses the initialized ORM to map the incoming LDAP requests to ORM expressions.

Thus, in response to a directory request received via path 135, LDAP interface 330 delegates the request to SQL interface 350. SQL interface 350 determines the ORM entities that are applicable for the request, builds ORM expressions with applicable entities and executes the ORM expressions using ORM framework 370. ORM framework 370, in turn inspects mapping data 380 and ORM expressions (sought to be executed), to identify the specific tables and columns corresponding to the attributes specified in the directory request (step 230).

ORM framework 370 then constructs and executes the SQL query corresponding to the mapped ORM expressions. The response from ORM framework 370 for the executed SQL query is in form of class instances (objects) according to the class hierarchy model. SQL interface 350 converts the objects to entries/values for attributes according to the LDAP hierarchy model, and forwards the values to LDAP interface 330, which returns the values as a reply to the directory request (along path 135).

Thus, VDS 150 processes requests received according to LDAP hierarchy model, while using database server 180 operating based on relational model. The manner in which VDS 150 processes a directory (search) request is described in detail below. As noted above, a similar technique may be employed for processing other types of directory requests as well. It may be noted that the programming logic for determination of the ORM entities, the building of the ORM expressions, the invocation of execution of ORM expressions (all part of SQL interface 350), are implemented by developers of VDS 150.

As is well known, a directory (search) request contains an identifier of a node in the hierarchical model 450 under which the values are to be retrieved, a number of levels in the hierarchy from which the values are to retrieved and a criteria that has to be satisfied by the retrieved values. The description is continued assuming that a directory (search) request contains the identifier as "dc=acme, dc=com", the number of levels as "subtree" (indicating all levels below the node) and the search criteria as "(&(cn=Mary)(o=ST))" (indicating that entries having the attribute "cn" set to value "Mary", and the attribute "o" set to value "ST" are to be retrieved).

Thus, in response to the search request noted above, LDAP interface 330 delegates the request to SQL interface 350 which identifies the ORM entities that are applicable for the request, constructs ORM expressions based on search criteria included in the request and executes the ORM query through ORM framework 370.

ORM framework 370 identifies that employee table 410 (based on the mapping of attribute "cn" to column UID), department table 420 (based on the link between employee and department tables) and phone table 430 (based on the link between employee and phone tables) is to be accessed for processing the search request. ORM framework 370 determines the table based on the initialization performed using mapping data 380 during VDS startup and ORM expressions provided during processing of search request by SQL interface 350. The description is continued assuming that SQL interface 350 identifies that all columns in the three tables are needed to be accessed. However, in alternative embodiments, only specific columns may be identified based on the directory request sought to be processed.

As noted above, ORM framework 370, after identifying the tables and columns corresponding to the directory search request, constructs the SQL query based on the ORM expressions and executes the constructed query in database 185. The manner in which SQL interface 350 may cause construction and execution of the SQL query corresponding to the directory/search request is described below with examples.

8. Constructing and Executing SQL Queries

SQL interface 350, in response to receiving an indication from LDAP interface 330 during VDS 150 initialization, first generates a set of virtual classes dynamically (on-the-fly) corresponding to the relational tables identified by mapping data 380. The set of classes are organized according to a class hierarchy different from the LDAP hierarchical model. In one embodiment, the set of classes are generated using an object relational mapping (ORM) framework 370.

ORM framework 370 facilitates conversion of data in the form of classes, class instances, and fields from/to data in the form of tables, rows and columns. As such, developers are facilitated to write programs in object oriented programming paradigm using classes, class instances, fields, methods etc. instead of a database paradigm using tables, rows and columns. An example of an ORM framework standard is Java Persistence API (JPA), while an implementation of the JPA standard is EclipseLink available from Oracle Corporation, the intended assignee of the subject application. An example set of classes that may be generated by ORM framework 370 is described in detail below.

Figure 6A:
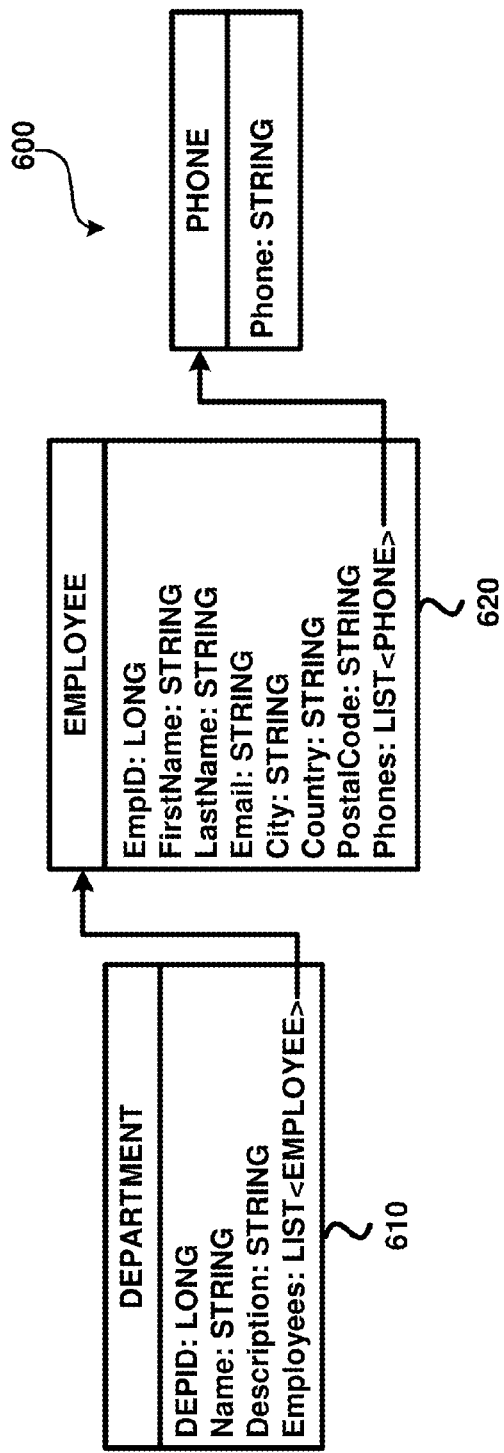
FIG. 6A depicts a set of classes generated representing the tables in a database in one embodiment.

FIG. 6A depicts a set of classes generated representing the tables (310) in a database (185) in one embodiment. Class hierarchy 600 is shown containing various classes and the relationships between the classes. Though not shown, class hierarchy generally contains a large number of classes and relationships based on the complexity (the number of tables, relationships between the tables, etc.) of the database schema.

Each of classes 610, 620 and 630 represents a corresponding table 420, 410 and 430 in database 185. Each class is shown as a corresponding box with two sections, the upper section specifying the name of the class and the lower section specifying the fields (each field being in the form "name: type") contained in the class. Thus, class 610 is named "DEPARTMENT" (as indicated by the upper section) and is showing containing the fields named "DEPID" (of type "LONG"), "Name" (of type "STRING"), etc. (in the lower section). It may be observed that the different fields of each class (for example, class 610) are defined corresponding to the columns in the corresponding tables (for example, table 420)

In addition, some of the fields of a class (for example, "Employees" of DEPARTMENT class 610) are shown to be of type represented by another class (for example, EMPLOYEE class 620) in class hierarchy 600. Such linking of the classes (as indicate by the arrows) may correspond to the relationships specified between the tables in database 185. For example, "List<EMPLOYEE>" indicates that there is a one-to-many relationship specified between tables 420 and 410 (corresponding to DEPARTMENT class 610 and EMPLOYEE class 620) in database 185.

Thus, class hierarchy 600 representing the tables, their columns and corresponding relationships is generated by ORM framework 370. Referring back to FIG. 3, SQL interface 350 then employs the generated set of classes (shown in class hierarchy 600) to construct and execute the ORM expression which in-turn executes the SQL query corresponding to the ORM expression constructed based on directory request.

In one embodiment, SQL interface 350 is designed to provide an input data to ORM framework 370 by employing the generated set of class. In other words, the input data indicates the tables and columns (identified by LDAP interface 330 based on configuration data 320) using the definitions in the generated classes (shown in class hierarchy 600).

An example input data for the search request (having the criteria "(&(cn=Mary)(o=ST))" is shown below (according to Java™ like pseudo-code instructions):

SQLQuery sqlQuery=new SQLQuery( );
sqlQuery.addTable("Employee");
exp1=expressionBuilder.get("UID").equals("Mary");
exp2=expressionBuilder.get("Department.Name").equals("ST");
exp1.and(exp2);
sqlQuery.addExpression(expression);

In response to the above input data, ORM framework 370 constructs the following query:

SELECT*FROM Employee, Department
WHERE Employee.UID='Mary'
AND Department.Name="ST"
AND Employee.DEPID=Department.DEPID;

where "SELECT", "FROM", "WHERE", "AND" are keywords according to SQL. It may be observed that the ORM expressions specified above (as input data) do not contain any of the SQL keywords or the specific format in which the query is to be constructed, in contrast to the prior approach noted above.

Thus, ORM framework 370 may be designed to generate optimal queries corresponding to the ORM expressions specified in VDS 150. Such optimization may include those that are provided specific to the (specific) implementation of the database server.

The constructed SQL query shown above is then executed in the backend server (database server 180) by ORM Framework 370. Thus, ORM framework 370 sends the constructed query to database server 180 and receives a corresponding response containing the results of execution of the query. The response includes values of the directory information (stored in tables 310) that matches the conditions specified in the SQL query (and correspondingly satisfies the search criteria "(&(cn=Mary)(o=ST))"). An example set of values retrieved from tables 310 of database 185 is described in detail below.

Figure 6B:
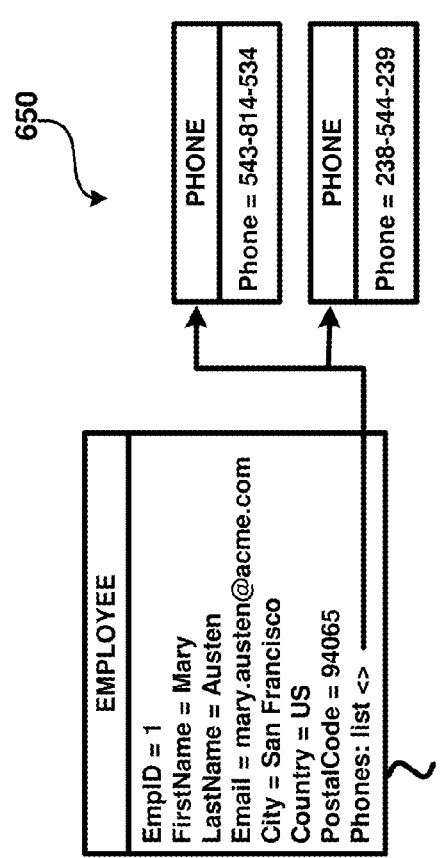
FIG. 6B depicts a set of values retrieved from directory information stored in a database server in one embodiment.

FIG. 6B depicts a set of values retrieved from directory information stored in a database server in one embodiment. In particular, FIG. 6B depicts the values that are provided by ORM framework 370 in response to execution of the SQL query noted above. Data 650 is accordingly shown containing various instances of the generated classes (shown in class hierarchy 600), with the fields of the class instances populated with the values retrieved from database server 180.

EMPLOYEE instance 660 is shown containing the values such as "Mary", "Austen", etc. retrieved from the row having EMPID=1 in table 410. It should be noted that for the information shown in table 410, only the row having UID (mapped to attribute "cn")="Mary" matches the search criteria "(&(cn=Mary)(o=ST))". The PHONE instances store the values of the phones associated with the employee having EMPID=1.

Referring back to FIG. 3, SQL interface 350 then converts the result of execution of the SQL query (as shown in FIG. 6B) to values corresponding to attributes according to the LDAP hierarchical model. For example, the values may be converted to LDAP entry 460 in FIG. 4B. The values according to the LDAP hierarchical model is then sent by LDAP interface 330 as a reply to the directory request. Thus, VDS 150 processes a directory (search) request based on a (LDAP) hierarchical model while using backend servers operating based on relational model (such as database server 180).

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 7:
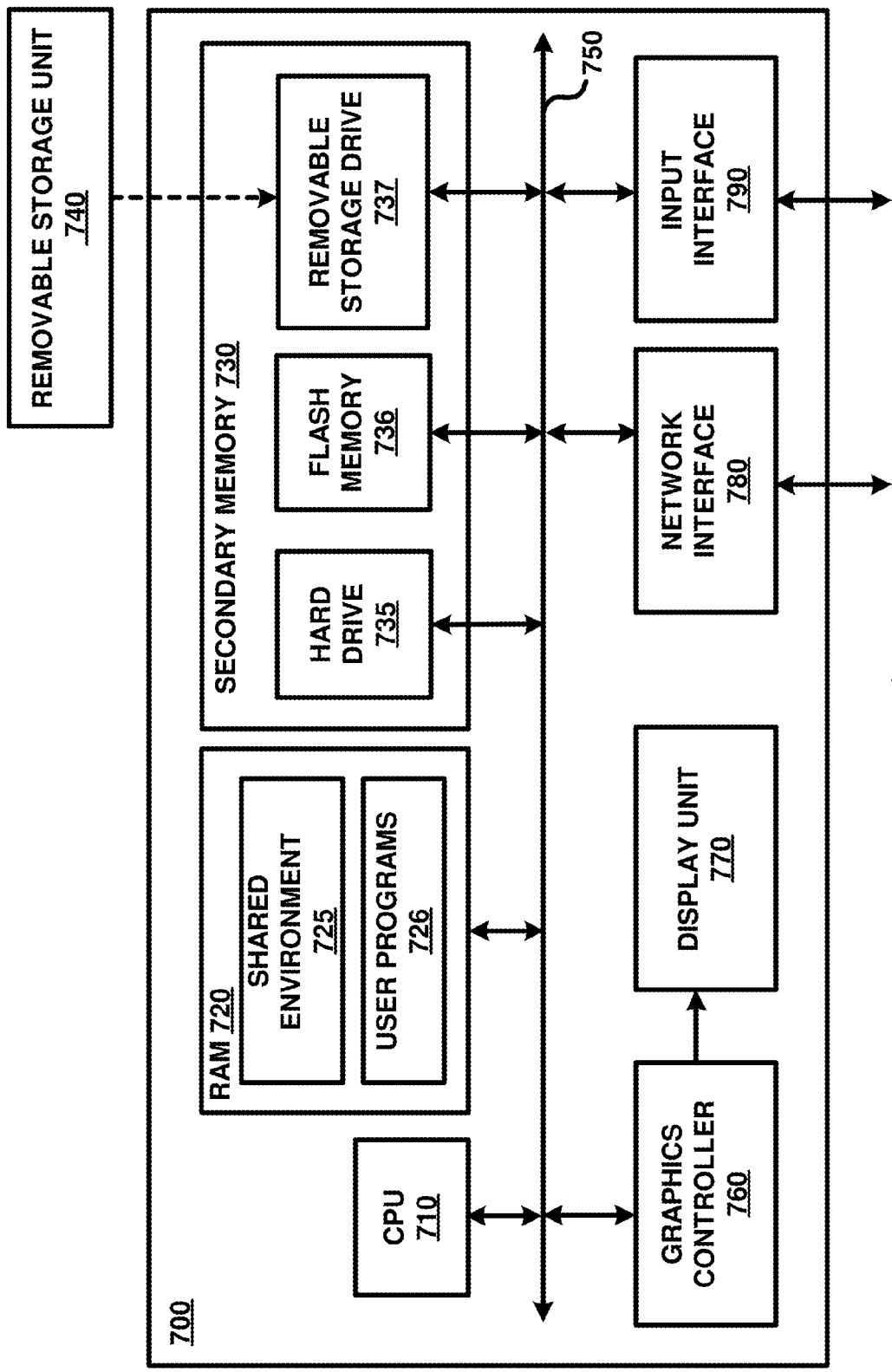
FIG. 7 is a block diagram illustrating the details of a digital processing system in which various aspects of the present invention are operative by execution of appropriate executable modules.

FIG. 7 is a block diagram illustrating the details of digital processing system 700 in which various aspects of the present invention are operative by execution of appropriate executable modules. Digital processing system 700 may correspond to VDS 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals (such as the user interfaces shown in FIGS. 5A-5C). Input interface 790 may correspond to a keyboard and a pointing device (e.g., touch-pad, mouse) and may be used to provide the user inputs required for several aspects of the present invention (such as those provided for interacting with the user interfaces shown in FIGS. 5A-5C). Network interface 780 provides connectivity to a network (e.g., using Internet Protocol), and may be used to communicate with other connected systems (such as client systems 110A-110C, database server 180, directory server 190, etc.) of FIG. 1.

Secondary memory 730 (representing a non-transitory storage/medium) may contain hard drive 735, flash memory 736, and removable storage drive 737. Secondary memory 730 may store the data (for example, portions of configuration data 320, mapping data 380, etc.) and software instructions (for example, for performing the steps of FIG. 2), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An enterprise computing system comprising:
   a backend server designed to store directory information based on a relational model, and to provide directory information as corresponding responses to queries based on said relational model, said relational model defining a plurality of tables, each table having corresponding columns; and
   a directory server to process directory requests based on a first hierarchical model, said first hierarchical model defining a plurality of attributes, said directory server comprises at least a processor and a memory, wherein execution of instructions stored in said memory causes said directory server to perform the actions of:
   generate a set of classes representing structure of said plurality of tables in said relational model, said set of classes being according to a second hierarchical model, each column of said plurality of tables corresponding to a field of one of said set of classes, wherein said second hierarchical model is different from said first hierarchical model;
   receive a first directory request for values corresponding to a set of attributes in said first hierarchical model;
   identify a set of tables, and a set of columns of said set of tables, in said relational model corresponding to said set of attributes;
   invoke an interface of a mapping module with an input data, said input data being specified in the form of a subset of said set of classes and fields of said subset, respectively representing said identified set of tables and said set of columns,
   wherein said mapping module, upon invocation of said interface, is designed to construct a relational query corresponding to said input data by employing said subset of said set of classes and fields according to said second hierarchical model, said relational query being based on said relational model,
   whereby said relational query based on said relational model is constructed upon said invocation;
   execute said relational query in said backend server to retrieve a set of values of said directory information, said set of values corresponding to said set of attributes; and
   send a first reply to said first directory request, said first reply containing said set of values retrieved from said backend server,
   said set of values being presented according to said first hierarchical model and corresponding to said set of attributes in said first reply.

2. The enterprise computing system of claim 1, wherein said directory server provides an execution environment according to a programming language, wherein a developer implements programming logic for processing directory requests in said programming language,
   wherein said set of classes are generated according to said programming language,
   whereby said developer is facilitated to construct said relational query by providing said input data in the form of said subset of said set of classes and fields to said mapping module.

3. The enterprise computing system of claim 1, wherein said directory server is further operable to maintain a configuration data indicating for each attribute in said first hierarchical model a corresponding column of said plurality of tables in said relational model storing the values of the attribute,
   wherein said directory server identifies said set of tables and said set of columns, based on said configuration data and said set of attributes received in said first directory request,
   wherein said set of columns are those of said plurality of tables which are indicated by said configuration data as storing values of said set of attributes.

4. The enterprise computing system of claim 1, wherein said directory server further performs the actions of receive a second directory request to perform an update operation on said set of attributes,
   wherein said mapping module constructs a second relational query designed to perform said update operation on said set of tables and said set of columns, wherein said execution of said second relational query in said backend server causes said update operation to be performed on said set of tables and said set of columns,
   wherein said directory server sends a result of execution of said update operation in a second reply to said second directory request.

5. The enterprise computing system of claim 4, wherein said update operation is one of a adding a new set of values, updating an existing set of values, and deleting an existing set of values.

6. The enterprise computing system of claim 5, wherein said first directory request and said second directory request are according to Lightweight Directory Access Protocol (LDAP).

7. The enterprise computing system of claim 1, wherein said interface comprises a plurality of procedures,
   wherein said first directory request includes a search criteria indicating the specific values to be retrieved,
   wherein said input data comprises calling a set of procedures of said plurality of procedures, said set of procedures specifying said search criteria,
   wherein said mapping module, in response to said calling of said set of procedures, includes a first set of conditions equivalent to said search criteria in said relational query,
   wherein said search criteria is according to said first hierarchical model and said first set of conditions are based on said relational model, wherein said set of values received in said corresponding response satisfy said first set of conditions, thereby satisfying said search criteria.

8. The enterprise computing system of claim 7, wherein said first set of conditions are according to a syntax required by implementation of said backend server.

9. The enterprise computing system of claim 8, wherein said mapping module is an ORM (object relational mapping) framework supporting dynamic generation of classes for persisting data to said backend server,
said ORM framework further comprising a mapping data specifying mapping from said set of classes and said fields according to said second hierarchical model to said plurality of tables and corresponding columns according to said relational model,
wherein said generate is performed by said ORM framework based on said mapping data.

10. The enterprise computing system of claim 9, wherein said ORM framework is an implementation of JPA (Java Persistence API) supporting dynamic persistence.

11. The method of claim 1, further comprising:
receiving a second directory request to perform an update operation on said set of attributes;
constructing a second relational query designed to perform said update operation on said set of tables and said set of columns;
executing said second relational query in said backend server to cause said update operation to be performed on said set of tables and said set of columns; and
sending a result of execution of said update operation in a second reply to said second directory request.

12. The method of claim 11, wherein said first directory request and said second directory request are according to Lightweight Directory Access Protocol (LDAP).

13. The method of claim 1, wherein said constructing further comprises:
invoking an interface of a mapping module with an input data, said input data being specified in the form of said subset of said set of classes and said fields representing said set of tables and said set of columns,
wherein said mapping module, upon invocation of said interface, is designed to construct said relational query corresponding to said input data by employing said subset of said set of classes and said fields according to said second hierarchical model, said relational query being based on said relational model,
whereby said relational query based on said relational model is constructed upon said invoking.

14. The method of claim 13, wherein said interface comprises a plurality of procedures,
wherein said first directory request includes a search criteria indicating the specific values to be retrieved,
wherein said input data comprises calling a set of procedures of said plurality of procedures, said set of procedures specifying said search criteria,
wherein said mapping module, in response to said calling of said set of procedures, includes a first set of conditions equivalent to said search criteria in said relational query,
wherein said search criteria is according to said first hierarchical model and said first set of conditions are based on said relational model,
wherein said set of values received in said corresponding response satisfy said first set of conditions, thereby satisfying said search criteria.

15. The method of claim 14, wherein said mapping module is an ORM (object relational mapping) framework supporting dynamic generation of classes for persisting data to said backend server, said ORM framework further comprising a mapping data specifying mapping from said set of classes and said fields according to said second hierarchical model to said plurality of tables and corresponding columns according to said relational model,
wherein said generate is performed by said ORM framework based on said mapping data.

16. The method of claim 15, wherein said ORM framework is an implementation of JPA (Java Persistence API) supporting dynamic persistence.

17. A method of processing directory requests based on a first hierarchical model in a virtual directory server (VDS), said first hierarchical model defining a plurality of attributes, wherein values corresponding to attributes are stored as directory information based on a relational model in a backend server, said backend server designed to provide said directory information as corresponding responses to queries based on said relational model, said relational model defining a plurality of tables, each table having corresponding columns, said method comprising:
generating a set of classes representing structure of said plurality of tables in said relational model, said set of classes being according to a second hierarchical model, each column of said plurality of tables corresponding to a field of one of said set of classes, wherein said second hierarchical model is different from said first hierarchical model;
receiving a first directory request for values corresponding to a set of attributes in said first hierarchical model;
identifying a set of tables, and a set of columns of said set of tables, in said relational model corresponding to said set of attributes;
determining a subset of said set of classes and fields of said set of tables in said second hierarchical model corresponding to said identified set of tables and said set of columns;
constructing a relational query employing said subset of said set of classes and said fields of said second hierarchical model, said relational query being according to said relational model and including said set of tables, and said set of columns thereof;
executing said relational query in said backend server to retrieve a set of values of said directory information, said set of values corresponding to said set of attributes; and
sending a first reply to said first directory request, said first reply containing said set of values retrieved from said backend server,
said set of values being presented according to said first hierarchical model and corresponding to said set of attributes in said first reply,
wherein said VDS comprises at least a processor and a memory, wherein said processor executes instructions stored in said memory to perform at least one of said generating, said receiving, said identifying, said determining, said constructing, said executing, and said sending.

18. The method of claim 17, wherein said VDS provides an execution environment according to a programming language, wherein a developer implements programming logic for processing directory requests in said programming language,
wherein said set of classes are generated according to said programming language,
whereby said developer is facilitated to construct said relational query by employing said subset of said set of classes and said fields in said programming language.

19. The method of claim 17, further comprising maintaining a configuration data indicating for each attribute in said first hierarchical model a corresponding column of said plurality of tables in said relational model storing the values of the attribute, wherein said identifying identifies said set of tables and said set of columns, based on said configuration data and said set of attributes received in said first directory request, wherein said set of columns are those of said plurality of tables which are indicated by said configuration data as storing values of said set of attributes.

20. A non-transitory machine readable storage medium storing one or more sequences of instructions for causing a virtual directory server (VDS) to process directory requests based on a first hierarchical model, said first hierarchical model defining a plurality of attributes, wherein values corresponding to attributes are stored as directory information based on a relational model in a backend server, said backend server designed to provide said directory information as corresponding responses to queries based on said relational model, said relational model defining a plurality of tables, each table having corresponding columns, said one of more sequences of instructions comprising:

a first set of instructions representing an ORM (object relational mapping) framework to generate a set of classes representing structure of said plurality of tables in said relational model, said set of classes being according to a second hierarchical model, each column of said plurality of tables corresponding to a field of one of said set of classes, wherein said second hierarchical model is different from said first hierarchical model; and a second set of instructions representing a programming logic operable to:

receive a first directory request for values corresponding to a set of attributes in said first hierarchical model;

identify a set of tables, and a set of columns of said set of tables in said relational model corresponding to said set of attributes;

invoke an interface of said ORM framework with an input data, said input data being specified in the form of a subset of said set of classes and fields of said subset respectively representing said set of tables and said set of columns, wherein said ORM framework, upon invocation of said interface, is designed to construct and execute a relational query corresponding to said input data by employing said subset of said set of classes and said fields according to said second hierarchical model, said relational query being based on said relational model, whereby said relational query based on said relational model is constructed and executed in said backend server upon said invocation, wherein execution of said relational query in said backend server retrieves a set of values of said directory information, said set of values corresponding to said set of attributes, wherein said programming logic sends a first reply to said first directory request, said first reply containing said set of values retrieved from said backend server, said set of values being presented according to said first hierarchical model and corresponding to said set of attributes in said first reply.

* * * * *